US012360977B2

(12) United States Patent
Glass et al.

(10) Patent No.: US 12,360,977 B2
(45) Date of Patent: Jul. 15, 2025

(54) RETRIEVAL-BASED, SELF-SUPERVISED AUGMENTATION USING TRANSFORMER MODELS

(71) Applicants: International Business Machines Corporation, Armonk, NY (US); University of Massachusetts Amherst, Amherst, MA (US)

(72) Inventors: Michael Robert Glass, Bayonne, NJ (US); Gaetano Rossiello, Brooklyn, NY (US); Alfio Massimiliano Gliozzo, Brooklyn, NY (US); Ankita Rajaram Naik, New York, NY (US); Xueqing Wu, Champaign, IL (US)

(73) Assignees: International Business Machines Corporation, Armonk, NY (US); University of Massachusetts Amherst, Amherst, MA (US)

( * ) Notice: Subject to any disclaimer, the term of this patent is extended or adjusted under 35 U.S.C. 154(b) by 22 days.

(21) Appl. No.: 18/191,896

(22) Filed: Mar. 29, 2023

(65) Prior Publication Data

US 2024/0330264 A1    Oct. 3, 2024

(51) Int. Cl.
  *G06F 16/22*      (2019.01)
  *G06F 16/2457*   (2019.01)
  *G06F 16/25*      (2019.01)

(52) U.S. Cl.
  CPC .... *G06F 16/2282* (2019.01); *G06F 16/24578* (2019.01); *G06F 16/258* (2019.01)

(58) Field of Classification Search
  CPC ............... G06F 16/2282; G06F 16/258; G06F 16/24578

(Continued)

(56) References Cited

U.S. PATENT DOCUMENTS 5,781,773 A    7/1998  Vanderpool et al.
8,412,670 B2   4/2013  Kuroda et al.
(Continued)

FOREIGN PATENT DOCUMENTS

WO    2018016001 A1    1/2018
WO    2019176824 A1    9/2019

OTHER PUBLICATIONS

Glass et al., "Re2G: Retrieve, Rerank, Generate," Conference of the North American Chapter of the Association for Computational Linguistics: Human Language Technologies, 2022, pp. 2701-2715.

(Continued)

*Primary Examiner* — Hanh B Thai
(74) *Attorney, Agent, or Firm* — CANTOR COLBURN LLP; Jordan Schiller

(57) ABSTRACT

Embodiments of the invention are directed to a computer system comprising a memory communicatively coupled to a processor system. The processor system is operable to perform processor system operations that include accessing query information associated with a to-be-augmented information set (TBAIS) having a TBAIS format. Query information sequence vectors (QISV) are generated that represent the query information and the TBAIS. Unannotated data repository information sequence vectors (UDRSV) are accessed that represent unannotated data repository information having a plurality of information formats. Matching UDRSV are identified, where the matching UDRSV include the UDRSV that match the QISV. A response to the query information is generated based at least in part on the matching UDRSV.

20 Claims, 11 Drawing Sheets

(58) Field of Classification Search
USPC ...................................................... 707/723
See application file for complete search history.

(56) References Cited

U.S. PATENT DOCUMENTS

| | | | | |
|---|---|---|---|---|
| 9,852,177 | B1* | 12/2017 | Cheung | G06F 16/245 |
| 11,194,798 | B2 | 12/2021 | Canim et al. | |
| 11,238,240 | B2* | 2/2022 | Hunter | G06F 40/103 |
| 11,580,145 | B1* | 2/2023 | Kumar | G06N 3/092 |
| 11,676,001 | B2* | 6/2023 | Jiao | G06N 3/0455 |
| | | | | 707/703 |
| 12,008,026 | B1* | 6/2024 | Sanz | G06F 16/3347 |
| 2001/0044794 | A1* | 11/2001 | Nasr | G06F 16/258 |
| | | | | 707/999.005 |
| 2009/0171728 | A1* | 7/2009 | Yan | G06F 16/951 |
| | | | | 705/14.54 |
| 2010/0205204 | A1* | 8/2010 | Gojobori | G16B 30/00 |
| | | | | 707/769 |
| 2011/0295858 | A1* | 12/2011 | Ahn | G06F 16/90344 |
| | | | | 707/E17.014 |
| 2013/0014088 | A1* | 1/2013 | Park | G06F 11/323 |
| | | | | 717/128 |
| 2017/0032273 | A1* | 2/2017 | Ho | G06N 7/01 |
| 2017/0262783 | A1* | 9/2017 | Franceschini | G06Q 10/063112 |
| 2017/0351781 | A1* | 12/2017 | Alexander | G06N 3/045 |
| 2019/0266167 | A1* | 8/2019 | Franceschini | G06N 5/02 |
| 2020/0133952 | A1* | 4/2020 | Sheinin | G06N 3/045 |
| 2020/0311608 | A1 | 10/2020 | Xu et al. | |
| 2020/0364253 | A1* | 11/2020 | Mugan | G06N 3/08 |
| 2020/0380384 | A1* | 12/2020 | Karunaratne | G06F 40/00 |
| 2021/0073922 | A1* | 3/2021 | Wang | G06N 20/00 |
| 2021/0097063 | A1* | 4/2021 | Wan | G06F 16/24578 |
| 2021/0117868 | A1* | 4/2021 | Sriharsha | G06N 20/20 |
| 2021/0141798 | A1* | 5/2021 | Steedman Henderson | |
| | | | | G06F 16/3344 |
| 2021/0271705 | A1* | 9/2021 | Koh | G06N 3/047 |
| 2021/0294781 | A1* | 9/2021 | Fernández Musoles | |
| | | | | G06F 16/367 |
| 2021/0294794 | A1* | 9/2021 | Bordawekar | G06F 9/3836 |
| 2021/0294799 | A1* | 9/2021 | Wu | G06F 16/2282 |
| 2021/0295434 | A1* | 9/2021 | Langdon, Jr. | G06F 16/24575 |
| 2021/0295822 | A1* | 9/2021 | Tomkins | G06F 16/3338 |
| 2021/0357187 | A1* | 11/2021 | Clement | G06F 8/35 |
| 2021/0357210 | A1* | 11/2021 | Clement | G06N 3/084 |
| 2021/0357762 | A1* | 11/2021 | Clement | G06N 3/084 |
| 2022/0075793 | A1* | 3/2022 | Jezewski | G06N 5/04 |
| 2022/0092088 | A1 | 3/2022 | Kimura et al. | |
| 2022/0101113 | A1* | 3/2022 | Tam | G06N 3/045 |
| 2022/0129471 | A1* | 4/2022 | Zellner | G06F 16/24578 |
| 2022/0165356 | A1* | 5/2022 | Bepler | G06F 16/24534 |
| 2022/0179889 | A1* | 6/2022 | Zhang | G06F 16/3347 |
| 2022/0244952 | A1* | 8/2022 | Breslav | G06F 8/33 |
| 2022/0253447 | A1* | 8/2022 | Boytsov | G06F 16/319 |
| 2022/0284028 | A1* | 9/2022 | Meng | G06F 16/3347 |
| 2022/0308848 | A1* | 9/2022 | Clement | G06F 8/51 |
| 2022/0309072 | A1 | 9/2022 | Zhang et al. | |
| 2022/0318255 | A1* | 10/2022 | Fei | G06F 16/24578 |
| 2022/0327356 | A1 | 10/2022 | Rossiello et al. | |
| 2022/0382979 | A1* | 12/2022 | Klein | G06F 40/284 |
| 2023/0073052 | A1* | 3/2023 | Mohylevskyy | G06N 3/0455 |
| 2023/0133522 | A1* | 5/2023 | Zhao | G06F 16/3349 |
| | | | | 707/769 |
| 2023/0135464 | A1* | 5/2023 | Cramer, Jr. | C12N 15/52 |
| | | | | 435/69.1 |
| 2023/0207064 | A1* | 6/2023 | Hamp | G16B 20/40 |
| | | | | 706/12 |
| 2023/0214633 | A1* | 7/2023 | Clinchant | G06N 3/045 |
| | | | | 704/9 |
| 2023/0229950 | A1* | 7/2023 | Selly | G16B 35/20 |
| 2023/0359441 | A1* | 11/2023 | Duan | G06N 3/084 |
| 2023/0401717 | A1* | 12/2023 | Wang | G06V 20/70 |
| 2023/0418848 | A1* | 12/2023 | Clinchant | G06F 40/40 |
| 2024/0020972 | A1* | 1/2024 | Ding | G06V 20/41 |
| 2024/0028740 | A1* | 1/2024 | Chan | G06F 21/577 |
| 2024/0070150 | A1* | 2/2024 | Nahamoo | G06F 16/3349 |
| 2024/0134614 | A1* | 4/2024 | Bakshi | G06F 8/65 |
| 2024/0153258 | A1* | 5/2024 | Mangla | G06V 10/7715 |
| 2024/0184570 | A1* | 6/2024 | Fu | G06F 8/73 |
| 2024/0265427 | A1* | 8/2024 | Olteanu Roberts | |
| | | | | G06Q 30/0271 |

OTHER PUBLICATIONS

Iida et al. "TABBIE: Pretrained Representations of Tabular Data," Conference of the North American Chapter of the Association for Computational Linguistics: Human Language Technologies, Jun. 6-11, 2021, pp. 3446-3456.

Yin et al., "TABERT: Pretraining for Joint Understanding of Textual and Tabular Data," 58th Annual Meeting of the Associate for Computational Linguistics, Jul. 5-10, 2020, pp. 8413-8426.

Zhang et al., "Auto-completion for data cells in relational tables," CIKM, Nov. 3-7, 2019, 10 pages.

Zhang et al., "Entitables: Smart assistance for entity-focused tables," Proceedings of the 40th International ACM SIGIR Conference on Research and Development in Information Retrieval, 2017, 10 pages.

Ahmadov et al., "Towards a Hybrid Imputation Approach Using Web Tables", 2015 IEEE/ACM 2nd International Symposium on Big Data Computing (BDC), Dec. 7-10, 2015, pp. 21-30.

Asai et al., "Evidentiality-guided Generation for Knowledge-Intensive NLP Tasks", arXiv:2112.08688v2 [cs.CL], May 14, 2022, 18 pages.

Bhagavatula et al., "Methods for exploring and mining tables on Wikipedia", IDEA '13: Proceedings of the ACM SIGKDD Workshop on Interactive Data Exploration and Analytics, Aug. 11, 2013, pp. 18-26.

Biesmann et al., "DataWig: Missing Value Imputation for Tables", Journal of Machine Learning Research, Nov. 2019, 6 pages.

Bogatu, et al., "Dataset Discovery in Data Lakes", arXiv:2011.10427v1 [cs.DB], Nov. 20, 2020, 12 pages.

Cafarella et al., "WebTables: exploring the power of tables on the web", Proceedings of the VLDB Endowment, Aug. 1, 2008, pp. 538-549.

Deng et al., "TURL: Table Understanding Through Representation Learning", arXiv:2006.14806v2 [cs.IR], Dec. 3, 2020, 14 pages.

Devlin et al., "BERT: Pre-training of Deep Bidirectional Transformers for Language Understanding", arXiv:1810.04805v2 [cs.CL], May 24, 2019, 16 pages.

Fernandez et al., "Aurum: A Data Discovery System", 2018 IEEE 34th International Conference on Data Engineering (ICDE), Apr. 16-19, 2018, 112 pages.

Gao et al., "Retrieval-Augmented Multilingual Keyphrase Generation with Retriever-Generator Iterative Training", arXiv:2205.10471v2 [cs.CL], Jun. 1, 2022, 15 pages.

Glass et al., "Capturing Row and Column Semantics in Transformer Based Question Answering over Tables", arXiv:2104.08303v2 [cs.AI], Apr. 26, 2021, 11 pages.

Glass et al., "Robust Retrieval-Augmented Generation for Zero-Shot Slot Filling", arXiv:2108.13934v2 [cs.CL], Sep. 14, 2021, 11 pages.

Guu et al., "Retrieval-Augmented Language Model Pre-training", arXiv:2002.08909 [cs.CL], Feb. 10, 2020, 12 pages.

He et al., "AutoML: A Survey of the State-of-the-Art", arXiv:1908.00709v6 [cs.LG], Apr. 16, 2021, 37 pages.

Herzig et al., "Open-Domain Question Answering over Tables via Dense Retrieval", arXiv:2103.12011v2 [cs.CL], Jun. 9, 2021, 8 pages.

Johnson et al., "Billion-Scale Similarity Search with GPUs", arXiv:1702.08734v1 [cs.CV], Feb. 28, 2017, 12 pages.

Karpukhin et al., "Dense Passage Retrieval for Open-Domain Question Answering", arXiv:2004.04906v3 [cs.CL], 13 pages.

Koehler et al., "Incorporating Data Context to Cost-Effectively Automate End-to-End Data Wrangling", IEEE Transactions on Big Data, Apr. 2019, pp. 169-186.

(56) References Cited

OTHER PUBLICATIONS

Lee et al., "Latent Retrieval for Weakly Supervised Open Domain Question Answering", arXiv:1906.00300v3 [cs.CL], Jun. 27, 2019, 11 pages.

Lee et al., "Robustifying Multi-hop QA through Pseudo-Evidentiality Training", arXiv:2107.03242 [cs.CL], Jul. 7, 2021, 10 pages.

Lehmberg et al., "The Mannheim Search Join Engine", Journal of Web Semantics, Dec. 2015, pp. 159-166.

Lewis et al., "BART: Denoising Sequence-to-Sequence Pretraining for Natural Language Generation, Translation, and Comprehension", arXiv:1910.13461v1 [cs.CL], Oct. 29, 2019, 10 pages.

Lewis et al., "Retrieval-Augmented Generation for Knowledge-Intensive NLP Tasks", arXiv:2005.11401v4 [cs.CL], Apr. 12, 2021, 19 pages.

Malkov et al., "Efficient and Robust Approximate Nearest Neighbor Search Using Hierarchical Navigable Small World Graphs", IEEE Transactions on Pattern Analysis and Machine Intelligence, Apr. 1, 2020, pp. 824-836.

Ott et al., "fairseq: A Fast, Extensible Toolkit for Sequence Modeling", arXiv:1904.01038v1 [cs.CL], Apr. 1, 2019, 6 pages.

Petroni et al., "KILT: A Benchmark for Knowledge-Intensive Language Tasks", arXiv:2009.02252v4 [cs.CL], May 27, 2021, 22 pages.

Rajpurkar et al., "Know What You Don't Know: Unanswerable Questions for SQUAD", arXiv:1806.03822v1 [cs.CL], Jun. 11, 2018, 9 pages.

Robertson et al., "The Probabilistic Relevance Framework: BM25 and Beyond", Foundations and Trends in Information Retrieval, Apr. 1, 2009, pp. 333-389.

Sarma et al., "Finding Related Tables", SIGMOD '12: Proceedings of the 2012 ACM SIGMOD International Conference on Management of Data, May 20, 2012, pp. 817-828.

Terrizzano et al., "Data Wrangling: The Challenging Journey from the Wild to the Lake", Proceedings of the Conference on Innovative Data Systems Research (CIDR), Jan. 4-7, 2015, 9 pages.

Xiong et al., "Approximate Nearest Neighbor Negative Contrastive Learning for Dense Text Retrieval", arXiv:2007.00808v2 [cs.IR], Oct. 20, 2020, 16 pages.

Yakout et al., "InfoGather: Entity Augmentation and Attribute Discovery by Holistic Matching with Web Tables", SIGMOD '12: Proceedings of the 2012 ACM SIGMOD International Conference on Management of Data, May 20, 2012, pp. 97-108.

Zhang et al., "Table2Vec: Neural Word and Entity Embeddings for Table Population and Retrieval", SIGIR'19: Proceedings of the 42nd International ACM SIGIR Conference on Research and Development in Information Retrieval, Jul. 18, 2019, pp. 1029-1032.

Zhu et al., "JOSIE: Overlap Set Similarity Search for Finding Joinable Tables in Data Lakes", SIGMOD '19: Proceedings of the 2019 International Conference on Management of Data, Jun. 25, 2019, pp. 847-864.

\* cited by examiner

Table Augmentation

Query Table:

Canton of Corilly Demographics

| Commune | Inhabitants | Postal code | INSEE code |
|---|---|---|---|
| Ainay-le-Chateau | 1165 | 3360 | 3003 |
| Braize | 257 | 3360 | 3037 |
| Corilly, Allier | 1568 | 3350 | 3049 |
| Isle-et Bardais | 321 | 3360 | 3130 |

Column Population

Answers:
Postal code
INSEE code

Row Population

Answers:
Corilly, Allier
Isle-et Bardais

FIG. 9

RETRIEVAL-BASED, SELF-SUPERVISED AUGMENTATION USING TRANSFORMER MODELS

BACKGROUND

The present invention relates in general to programmable computers that prepare digital information for analysis. More specifically, the present invention relates to computing systems, computer-implemented methods, and computer program products that implement novel retrieval-based, self-supervised information/data augmentation techniques using transformer models.

The wide availability and relatively low cost of miniaturized computing systems has significantly increased the ability to gather digital information and/or data about any activity that can be monitored and stored using technology. Examples of such activity include digital information/data about a demographic, a system, a concept, and/or an environment. The gathered digital information/data is generally referred to as raw information/data and is generated by a variety of independent sources (e.g., an Internet of Things (IoT) sensing device) and captured/stored in a variety of information formats. In general, raw data is data that has not been processed, coded, formatted, or yet analyzed for useful insights. In other words, raw data is data that has been collected from one or multiple sources but is still in its initial, unaltered state. Although raw data is a valuable resource, it is not easily comprehended or acted upon, as it is visually cluttered; lacks cohesion; could contain numerous human, machine, or instrumental errors; and/or lacks validation.

So-called data preparation processes are often a prerequisite to performing data analytics operations to gain insights from raw data. Data preparation processes prepare raw data for being ingested (e.g., using data translation processes to convert the prepped data into a form that is machine-readable) by data analysis systems such as graph models, machine learning models, and the like. An example data preparation process is known as data wrangling, which is the process of finding, interpreting, extracting, preparing, and recombining the raw data that is to be translated, ingested, and analyzed. For raw data that is collected as free-form text, the lack of standards or competing standards often result in a variety of formats for expressing the same type of data, making the data wrangling step a tedious and error-prone process. For example, a United States (U.S.) street addresses can be expressed with a house number, a Post Office (P.O.) Box, a rural route, and/or a direction-all of which can be abbreviated or spelled out in a variety of ways. Data wrangling operations are considered some of the most expensive and time-consuming steps when preparing raw data for analytics analysis or building models such as machine learning models.

The way organizations store and manage data is rapidly evolving from using strict transactional databases to data lakes that include large collections of heterogeneous data formats, such as tabular data, spreadsheets, databases, and so on. Data lakes can be viewed as centralized repositories containing virtually inexhaustible amounts of raw (or minimally curated) data that are readily made available anytime to anyone authorized to perform analytical activities. Data lakes can relieve users from dealing with data acquisition and maintenance issues, and guarantee fast access to local, accurate, and updated data without incurring development costs (e.g., time and money) typically associated with structured data warehouses. However, raw data is challenging to interpret, hard to describe, and tedious to maintain. Furthermore, these challenges multiply as the number of data sources grows, thus increasing the need to thoroughly describe and curate the data in order to make it consumable. The absence of a unified schema in data lakes does not allow the usage of declarative query languages, thus making the process of data preparation dramatically expensive.

Data preparation involves several phases, such as data discovery, structuring, cleansing, enrichment, and validation, with the purpose to produce views commonly organized in a tabular format used to create reports or to gather feature sets to build machine learning models. The schemaless nature of data lakes makes data discovery and structuring even more challenging because the tasks of joinability and unionability among tables become non-deterministic. In general, in a deterministic environment, any action has a single guaranteed effect and no failure or uncertainty. On the contrary, in a non-deterministic environment, the same task performed twice can produce different results or can even fail completely Accordingly, there is a need for automated data wrangling techniques that facilitate the analysis efforts of end-users, e.g., data analysts, in performing data analysis tasks (e.g., table augmentation) using heterogenous data structures in data repositories such as data lakes.

SUMMARY

Embodiments of the invention are directed to a computer system comprising a memory communicatively coupled to a processor system. The processor system is operable to perform processor system operations that include accessing query information associated with a to-be-augmented information set (TBAIS) having a TBAIS format. Query information sequence vectors (QISV) are generated that represent the query information and the TBAIS. Unannotated data repository information sequence vectors (UDRSV) are accessed that represent unannotated data repository information having a plurality of information formats. Matching UDRSV are identified, where the matching UDRSV include the UDRSV that match the QISV. A response to the query information is generated based at least in part on the matching UDRSV.

Technical effects and benefits of the above-described embodiments of the invention include providing a retrieval-based technique for identifying a response to the query by drawing the response from contents of a data repository having a plurality of information formats. The claimed retrieval-based response generation technique is trained to provide the best possible response from the data repository having predefined responses that are based on existing information. The claimed retrieval-based response technique does not rely on keywords matching, parametric-based machine learning, or parametric-based deep learning to create the response, but instead uses a novel vector matching technique to "retrieve" the most appropriate response, thus avoiding the additional uncertainty and inaccuracies that are introduced by the process of creating a response that did not previously exist. Additionally, the data repository information is unannotated, which means the response is identified in or retrieved from the unannotated data repository using a self-supervised identification technique for identifying matching UDRSV that includes the UDRSV that match the QISV without having to incur the expense (time and/or cost) of annotating or otherwise labeling the data repository information prior to analysis.

In addition to one or more of the features described above, or as an alternative to any of the foregoing embodiments of the invention, generating the QISV includes converting the query information to sequenced query information; and using a transformer model of the processor system to convert the sequenced query information to the QISV.

Technical effects and benefits of the above-described embodiments of the invention include incorporating a sequence-based, transformer model into the retrieval-based technique for identifying a response to the query that draws the response from contents of the data repository having the plurality of information formats. The claimed transformer model is non-parametric in that it does not rely on using "parametric" machine learning vector-analysis techniques to uncover hidden data relationships that are used to generate a response that did not previously exist. The responses generated by parametric approaches to using transformer models do not include any type of explanation, guidance, or accuracy conformation information for how the generated output from the transformer model was generated. By contrast, the claimed transformer model is used in a process that provides a traceable path to the selected response and how the selected response was matched with the query, thus allowing the generation of explanations, guidance, or accuracy conformation information for how the response generated using the novel vector-based matching techniques was generated.

In addition to one or more of the features described above, or as an alternative to any of the foregoing embodiments of the invention, identifying the matching UDRSV comprises using an approximate nearest neighbor (ANN) search technique operable to identify one or more instances of the UDRSV that substantially match the QISV.

Technical effects and benefits of the above-described embodiments of the invention include incorporating an ANN search technique that facilitates the previously-described self-supervised identification technique for identifying matching UDRSV that includes the UDRSV that match the QISV without having to incur the expense (time and/or cost) of annotating or otherwise labeling the data repository information prior to analysis.

Embodiments of the invention are also directed to computer-implemented methods and computer program products having substantially the same features, technical effects, and technical benefits as the computer system described above.

Additional features and advantages are realized through techniques described herein. Other embodiments and aspects are described in detail herein. For a better understanding, refer to the description and to the drawings.

BRIEF DESCRIPTION OF THE DRAWINGS

The subject matter which is regarded as embodiments is particularly pointed out and distinctly claimed in the claims at the conclusion of the specification. The foregoing and other features and advantages of the embodiments are apparent from the following detailed description taken in conjunction with the accompanying drawings in which:

FIG. 9 depicts a simplified block diagram illustrating example table augmentation results achievable using aspects of the invention.

Figure 1A:
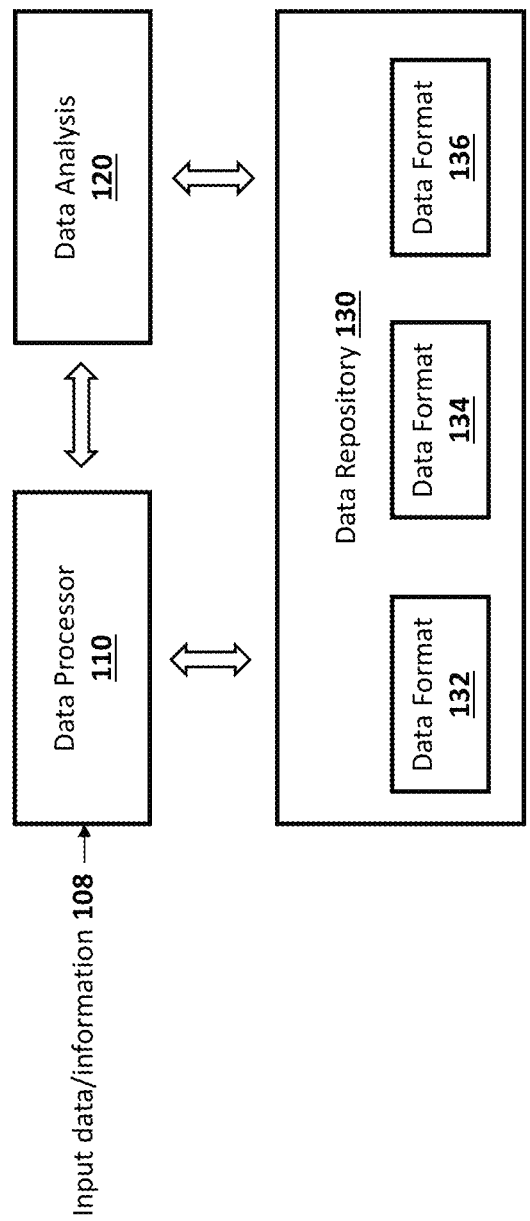
FIG. 1A depicts a simplified block diagram illustrating a system embodying aspects of the invention.

In the accompanying figures and following detailed description of the disclosed embodiments, the various elements illustrated in the figures are provided with three-digit reference numbers. In some instances, the leftmost digits of each reference number corresponds to the figure in which its element is first illustrated.

DETAILED DESCRIPTION

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Many of the functional units of the systems described in this specification have been labeled as modules. Embodiments of the invention apply to a wide variety of module implementations. For example, a module can be implemented as a hardware circuit including custom VLSI circuits or gate arrays, off-the-shelf semiconductors such as logic chips, transistors, or other discrete components. A module can also be implemented in programmable hardware devices such as field programmable gate arrays, programmable array logic, programmable logic devices or the like. Modules can also be implemented in software for execution by various types of processors. An identified module of executable code can, for instance, include one or more physical or logical blocks of computer instructions which can, for instance, be organized as an object, procedure, or function. Nevertheless, the executables of an identified module need not be physically located together but can include disparate instructions stored in different locations which, when joined logically together, function as the module and achieve the stated purpose for the module.

The various components/modules of the systems illustrated herein are depicted separately for ease of illustration and explanation. In embodiments of the invention, the functions performed by the various components/modules can be distributed differently than shown without departing from the scope of the various embodiments of the invention describe herein unless it is specifically stated otherwise.

Turning now to an overview of aspects of the invention, embodiments of the invention provide a novel approach to automatic data wrangling that alleviates the effort of end-users, e.g. data analysts, in structuring dynamic views from data lakes in the form of tabular data. Accordingly, embodiments of the invention provide computing systems, computer-implemented methods, and computer program products that implement novel retrieval-based, self-supervised information augmentation techniques using transformer models. Embodiments of the invention address table augmentation tasks, including row/column population and data imputation. Given a corpus of tables, embodiments of the invention utilize a retrieval-based augmented self-trained transformer model. A novel self-learning strategy is used that includes randomly ablating tables from the corpus and training the retrieval-based model to reconstruct the original values or headers given the partial tables as input. This strategy is used to first train the dense neural retrieval model by encoding table parts to vectors, and then the end-to-end model is trained to perform table augmentation tasks.

Turning now to a more detailed description of various embodiments of the invention, FIG. 1A depicts a simplified block diagram illustrating a system 100 operable to implement embodiments of the invention. The system 100 includes a data processor module 110, a data analysis module 120, and a data repository 130, configured and arranged as shown. The data repository 130 includes heterogenous data/information in a variety of information formats, examples of which are shown as data format 132, data format 134, and data format 136. Although three examples of data formats are shown in FIG. 1A, it is contemplated that any suitable number of number of data formats can be provided in the data repository 130. In embodiments of the invention, a cloud computing system 50 is in wired or wireless electronic communication with the system 100. The cloud computing system 50 can supplement, support or replace some or all of the functionality (in any combination) of the system 100, including specifically the data processor 110. Additionally, some or all of the functionality of the system 100, including specifically the data processor module 110, can be implemented as a node of the cloud computing system 50. Additional details of cloud computing functionality that can be used in connection with aspects of the invention are depicted by the computing environment 1000 shown in FIG. 10 and described in greater detail subsequently herein.

In accordance with embodiments of the invention, the data processor 110 can be configured to receive input data/information 108 and perform various data processing operations that prepare the input data/information 108 such that it can be efficiently and effectively ingested and utilized by the data analysis module 120. In accordance with aspects of the invention, the data processing operations performed by the data processor module 110 utilizes novel retrieval-based, self-supervised data wrangling operations that interface with the data repository 130 to leverage the contents of the data repository 130 when performing data processing operations on the input data/information 108. For example, in some embodiments of the invention, the retrieval-based, self-supervised data wrangling operations are used to leverage the contents of the data repository 130 by using the contents of the data repository 130 to augment the input data/information 108 in order to place the input data/information 108 in better and more robust condition for ingestion and use by the data analysis module 120. Additional details of how various aspects of the system 100 can be implemented, along with descriptions of the operations performed by the system 100, are depicted in FIG. 1B through FIG. 10 and described in greater detail subsequently herein.

Figure 1B:
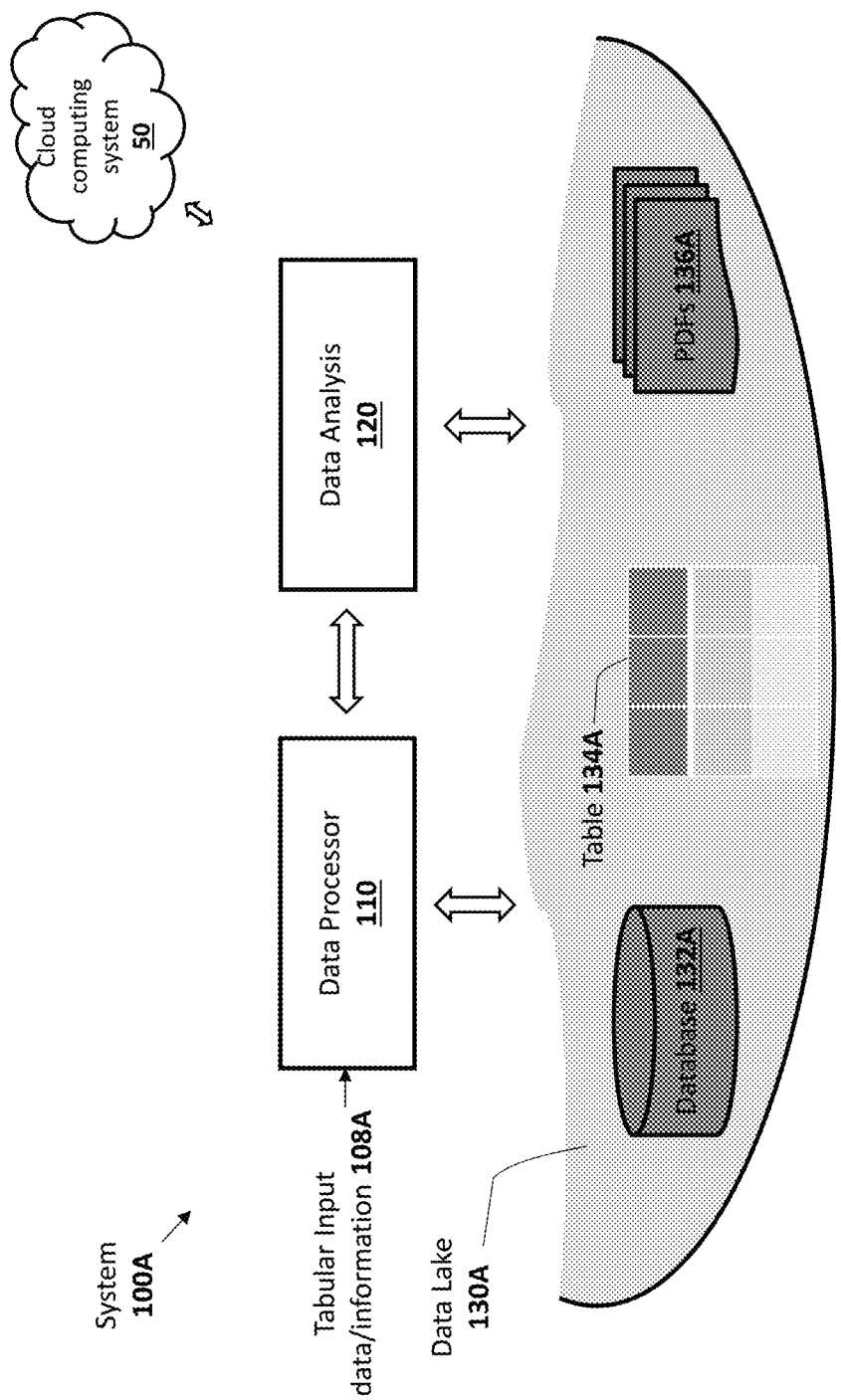
FIG. 1B depicts a simplified block diagram illustrating a system embodying aspects of the invention.
Figure 2:
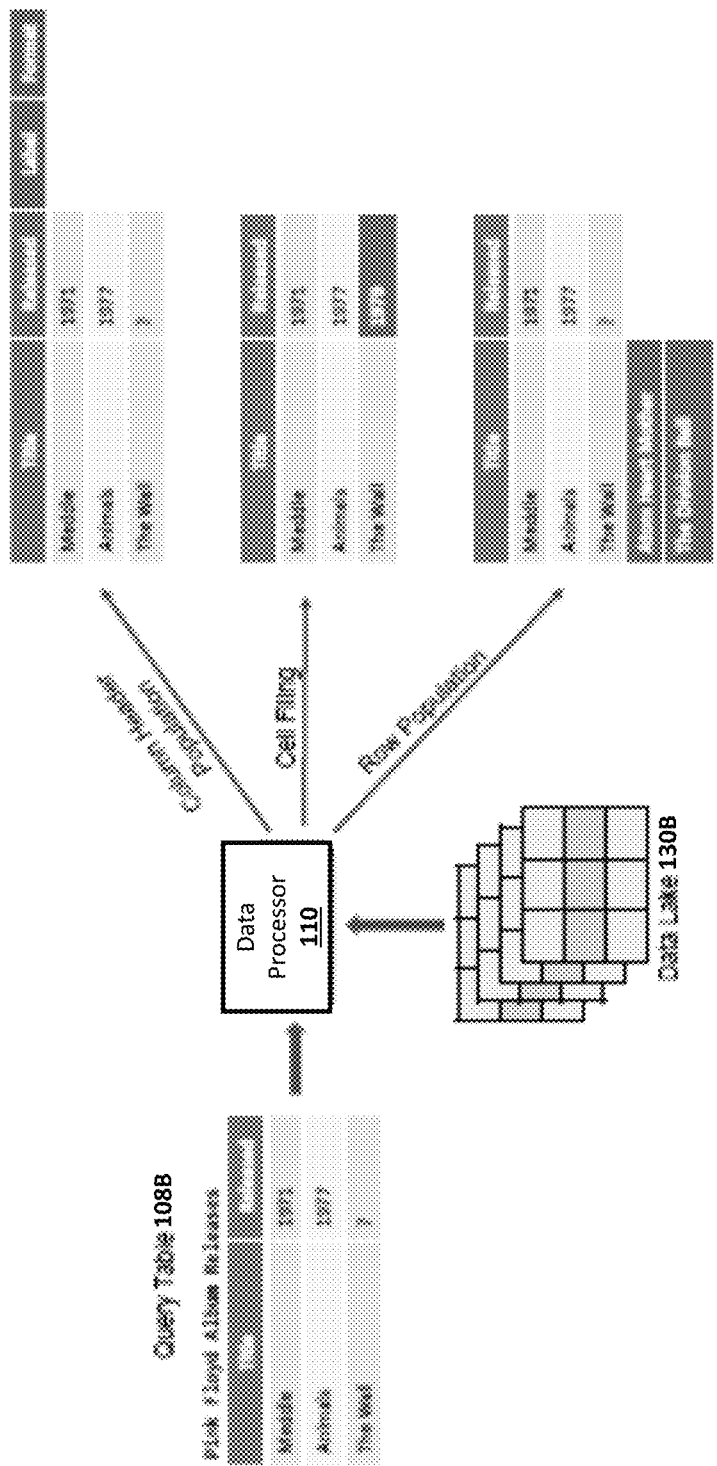
FIG. 2 depicts a simplified block diagram illustrating example table augmentation tasks that can be performed using aspects of the invention.

FIG. 1B depicts a simplified block diagram illustrating a system 100A operable to implement embodiments of the invention. The system 100A is substantially identical to the system 100 shown in FIG. 1A except the input information/data 108 is implemented as tabular input information/data 108A; the data repository 130 is implemented as a data lake 130A; the data format 132 is implemented as a database 132A; the data format 134 is implemented as a table 134A; and the data format 136 is implemented as a portable document format (PDF) 136A. FIG. 2 depicts a non-limiting example augmentation task that can be performed by the systems 100, 100A in accordance with aspects of the invention. In the example depicted in FIG. 2, the tabular input information/data 108A can be implemented as the query table 108B, and the data lake 130A is implemented as a data lake 130B having a plurality of tables having a plurality of tabular formats and tabular information formats.

The table augmentation tasks shown in FIG. 2 can be divided into three sub-tasks, namely, row population, column population, and cell filling. The query table 108B is a partially completed table used as a query (i.e., a few album releases from the Pink Floyd discography), and the three table augmentation tasks includes retrieving from the data lake 130B a list of possible next column headers, such as the "Label" or "Format"; the missing value "1979" for the release date of the row "The Wall"; and a list of other album releases as possible next rows, such as "Atom Heart Mother" and "The Division Bell."

Figure 3:
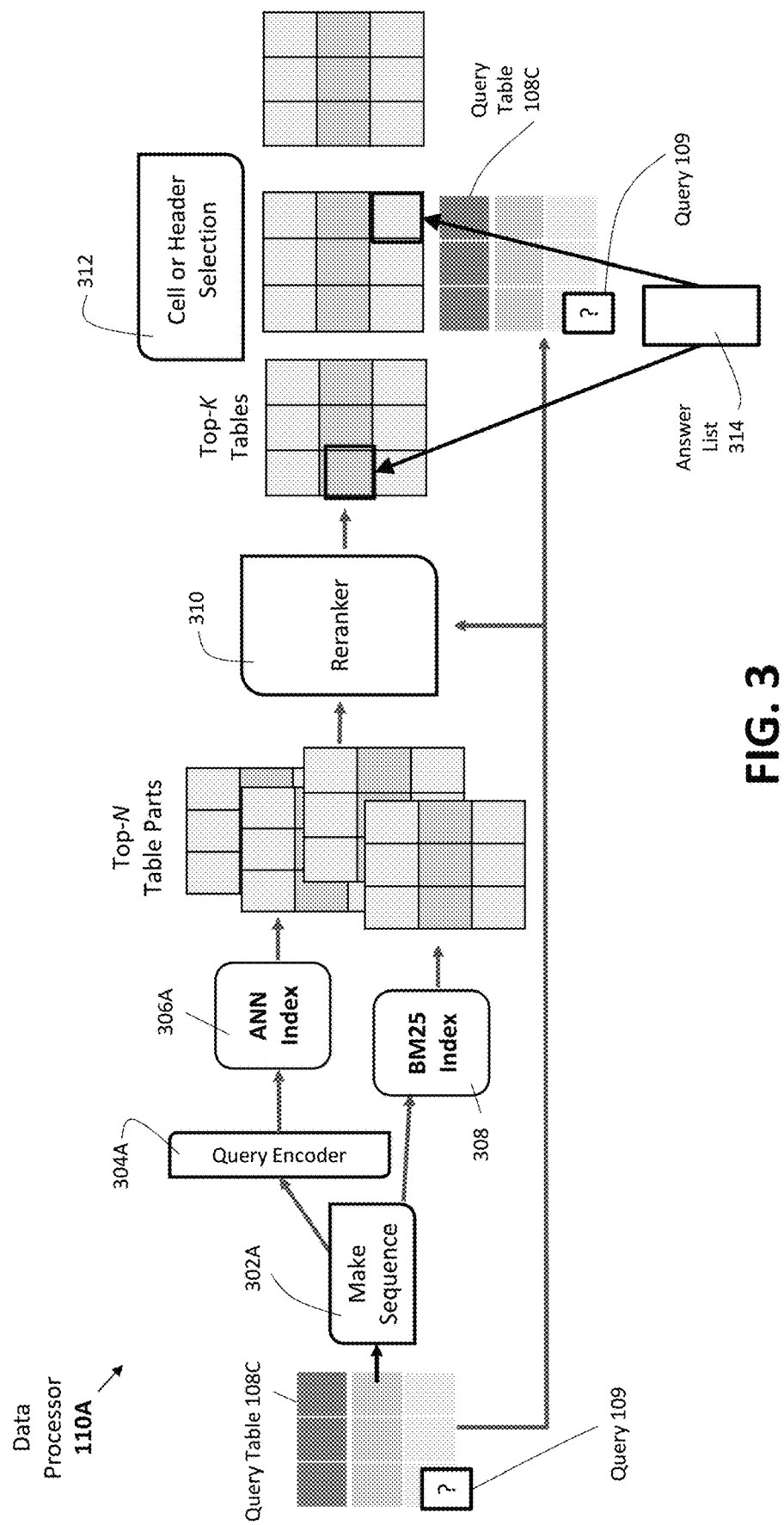
FIG. 3 depicts a simplified block diagram illustrating a system embodying aspects of the invention.

FIG. 3 depicts a simplified block diagram illustrating a data processor 110A, which is a non-limiting example implementation of the data processor 110 (shown in FIGS. 1A, 1B, and 2). As shown, the data processor 110A includes a make sequence module 302A, a query encoder module 304A, an approximate nearest neighbor (ANN) index module 306A, an optional keyword search module implemented as a BM25 search module 308, an optional re-ranking module 310, and a cell or header selection module 312, configured and arranged as shown. In accordance with aspects of the invention, the ANN index module 306A is an example implementation of the vector matching module 306 (shown in FIG. 5); the query encoder 304A is an example implementation of the transformer model module 304 (shown in FIG. 5); and the make sequence module 302A is an example implementation of the sequencer 302 (shown in FIG. 5).

As shown in FIG. 3, a query table 108C includes a query 109 and is input to the make sequence module 302A. The query table 108C include various input data/information organized in a tabular format, and the query 109 represents a table augmentation operation (e.g., row population, column population, and/or cell filling) to be performed by the data processor 110A. The make sequence module 302A receives the query table 108C and the query 109 and converts them (including the tabular format) to a sequence that is provided to the query encoder 304A, which converts the sequence to vectors. In some embodiments of the invention, the query encoder 304A is an example implementation of an encoder segment of a transformer model (e.g., the transformer model module 304 shown in FIG. 5) that captures the content and the meaning of the sequence received from the make sequence module 302A. In general, a transformer model (also known as a generative language model), which is a type of encoder-decoder sequence-tosequence model, can be trained to perform many of the tasks described herein in accordance with aspects of the invention. In a transformer model, the encoder can include a set of encoding layers that processes the input iteratively one layer after another, and the decoder can include a set of decoding layers that does the same thing to the output of the encoder. The function of each transformer encoder layer is to process its input to generate encodings that contain information about which parts of the inputs are relevant to each other. The transformer encoder passes its set of encodings to the next transformer encoder layer as inputs. Each transformer decoder layer does the opposite, taking all the transformer encodings and processing them, using their incorporated contextual information, to generate an output sequence. To achieve this, each transformer encoder layer and transformer decoder layer makes use of an attention mechanism. In the context of neural networks, an attention mechanism is a technique that electronically mimics human cognitive attention. The effect enhances the important parts of the input data and fades out the rest such that the network devotes more computing power on the important part of the data. The part of the data that is more important than other parts of the data depends on the context and is learned through training data by gradient descent. Thus, the transformer model's attention mechanism weighs the relevance of every other input and draws information from them accordingly to produce the output. Each transformer decoder layer can include an additional attention mechanism that draws information from the outputs of previous transformer decoders before the transformer decoder layer draws information from the transformer encodings. Both the transformer encoder layers and the transformer decoder layers have a feed-forward neural network for additional processing of the outputs, and also contain residual connections and layer normalization steps.

Transformer models can be autoregressive and/or auto-encoding. Autoregressive transformer models utilize previous predictions to generate a new prediction. Training an autoregressive transformer model therefore involves a language modeling task, which means that the autoregressive transformer model has to learn a language and interdependencies between words and phrases, along with semantics. Text generation is a classic task that can be performed with autoregressive transformer models. On the other hand, autoencoding transformer models corrupt textual inputs and generate the original inputs in return. The result is a transformer encoding that can be used for additional downstream tasks, such as question answering.

Thus, it can be seen from the forgoing descriptions that a transformer model suitable for use in accordance with aspects of the invention includes a deep learning model that utilizes the mechanism of attention to weigh the influence of different parts of the input data. Like RNNs, transformer models are designed to handle sequential data, such as natural language, for tasks such as translation, text summarization, text classification, question answer, and the like. However, unlike RNNs, transformer models do not require that the sequential data be processed in order. For example, if the input data is a natural language sentence, a transformer model does not need to process the beginning of the input data before processing the end of the input data. Due to this feature, transformer models allows for much more parallel computing than RNNs. Parallel computing is a type of computation where many calculations or the execution of processes are carried out simultaneously. Large problems can often be divided into smaller ones, which can then be solved at the same time. In the context of training, parallel computing features of transformers enable a reduction in training times for transformer models to be achieved in comparison to the required training times for pre-transformer RNN models such as the long short-term memory (LSTM).

Continuing with FIG. 3, optionally, the sequence generated by the make sequence module 302A can also be provided to a keyword search module implemented as the BM25 index search module 308, which can be used to further support the operations performed by the ANN index module 306A. The BM25 algorithm aggregates and uses information from all the documents in the input data via the term frequency (TF) and inverse document frequency (IDF) based options.

Figure 4:
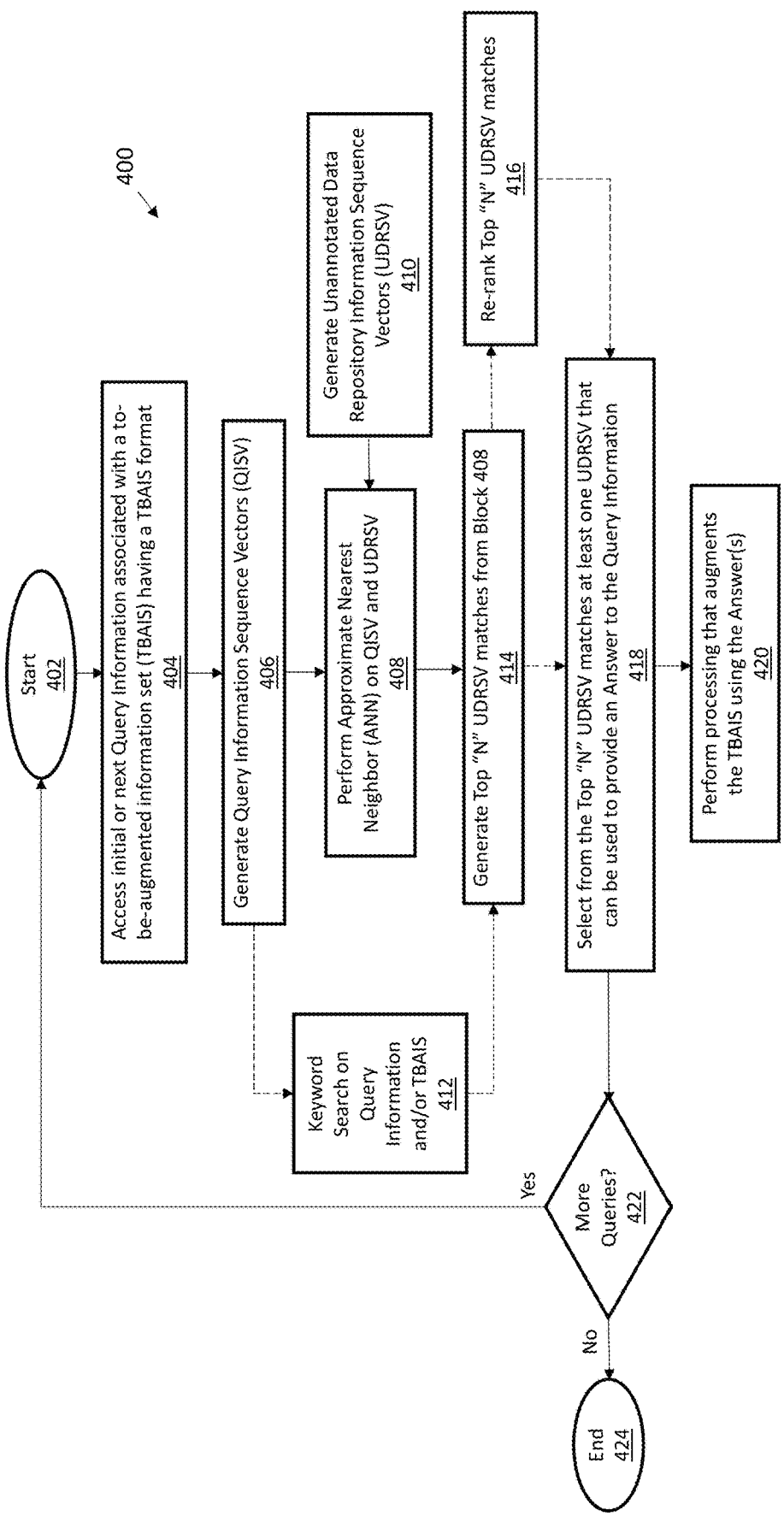
FIG. 4 depicts a flow diagram illustrating a computer-implemented methodology according to aspects of the invention.
Figure 5:
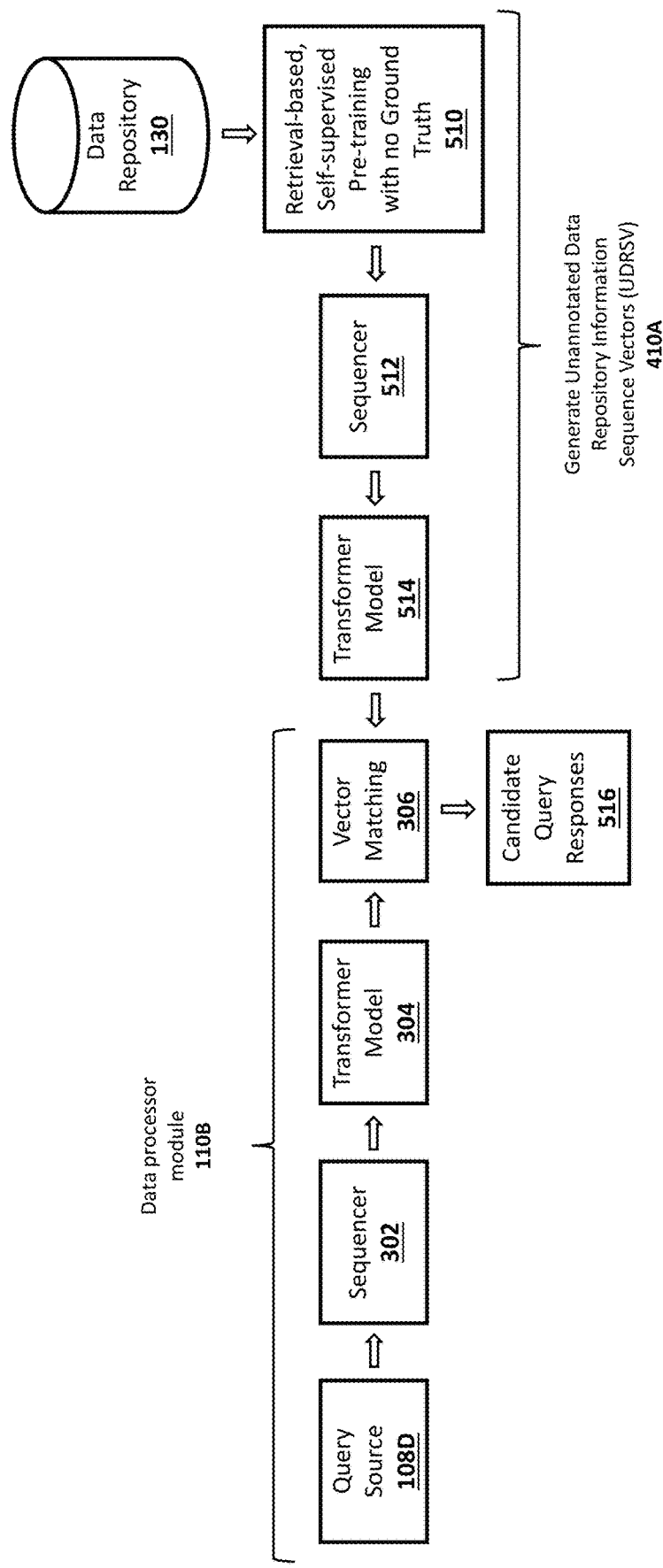
FIG. 5 depicts a simplified block/flow diagram illustrating a vector matching operation according to aspects of the invention.
Figure 8:
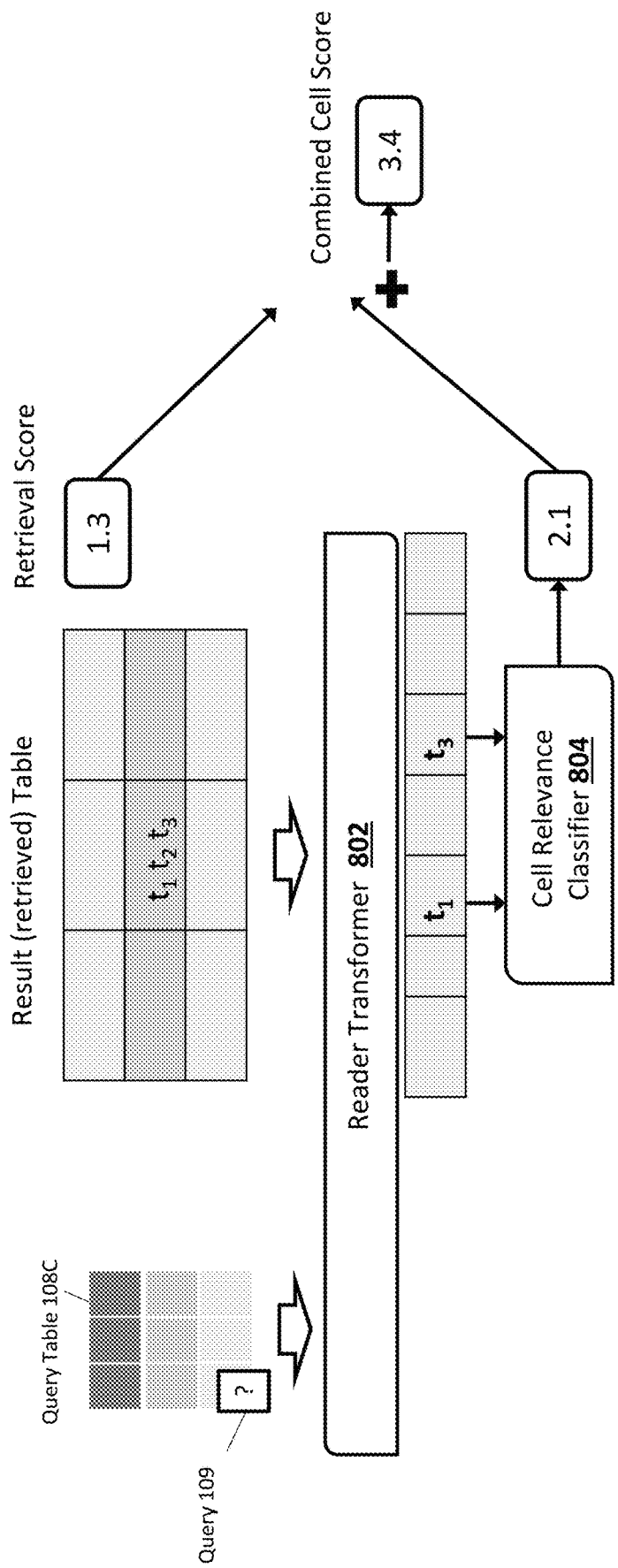
FIG. 8 depicts a simplified block diagram illustrating header and/or cell identification operations according to aspects of the invention.

The encoded sequence generated by the query encoder 304A is provided to the ANN index module 306A, which also receives inputs from offline operations that have analyzed, consolidated (e.g., through eliminating redundancies), and vectorized selected elements of the data repository 130 and/or the data lake 130A. Example operations to generate the additional inputs to the ANN index module 306A are shown in FIG. 4 as the operations performed at block 410. Example operations to generate the additional inputs to the ANN index module 306A are also shown in FIG. 5 as the operations performed at block 410A, along with a "retrieval-based, self-supervised pre-training operation with no ground truth" 510 (i.e., no annotated or labeled data/information in the repository 130 and/or the data lake 130A), a sequencer 512, and a transformer model module 512, configured and arranged as shown. In accordance with embodiments of the invention, the ANN index module 306A performs a vector matching operation as an ANN operation that identifies the sequenced and vectorized instances of data/information from the data repository 130, 130A that match (or are nearest to) the encoded (or vectorized) sequence generated by the query encoder 304A to generate the Top-N (where N=a preselected whole number) table parts shown in FIG. 3. Optionally, a re-ranker module 310 is used to re-rank the Top-N table parts to generate a set of Top-K (where K=a preselected whole number) table parts. A cell or header selection module 312 is used to select the portions of the Top-K tables that can provide a response or answer to the query 109, thus generating an answer list 314. Additional details of how the cell or header selection 312 can be implemented is shown in FIG. 8 and described in greater detail subsequently herein.

FIG. 4 depicts a flow diagram illustrating a computer-implemented methodology 400 according to embodiments of the invention. The computer-implemented methodology 400 is implemented by the system 100, 100A, and particularly by the data processor module 110, 110A. Accordingly, the following descriptions of the methodology 400, where appropriate, may refer to the flow diagram depicted in FIG. 4, along with the relevant systems and/or components shown in FIGS. 1A, 1B, 2, 3, and 4-10. The methodology 400 begins at block 402 then moves to block 404 to access initial or next query information (e.g., query 109) associated with a to-be-augmented information set (TBAIS) (e.g., contents of query table 108C) having a TBAIS format (e.g., query table 108C).

At block 406, the methodology 400 generates query information sequence vectors (QISV) using, for example, the previously-described operations performed by the make sequence module 302A and the query encoder 304A. In an offline operation, block 410 generates unannotated data repository information sequence vectors (UDRSV) that is provided to block 408. Example operations to generate the additional inputs to block 408 are also shown in FIG. 5 as the operations performed at block 410A, along with a "retrieval-based, self-supervised pre-training operation with no ground truth" 510 (i.e., no annotated or labeled data/ information in the repository 130 and/or the data lake 130A), a sequencer 512, and a transformer model module 512, configured and arranged as shown. In accordance with embodiments of the invention, block 408 performs a vector matching operation implemented as an ANN operation performed on QISV and UDRSV to identify the sequenced and vectorized instances of data/information from the data repository 130, 130A that match (or are nearest to) the encoded (or vectorized) sequence generated by the query encoder 304A The output from block 408 is provided to block 414, which generates the top "N" UDRSV matched generated at block 408. Optionally, the operations at block 414 can be assisted by outputs from block 412, which performs a keyword search on query information and/or the TBAIS (e.g., using the keyword based BM25 index module 308 shown in FIG. 3).

Block 418 receives the either the output from block 414 or the output from block 416. In some embodiments of the invention, the top "N" USDRSV can optionally be routed to block 418 through block 416, which is operable to re-rank the "N" UDRSV matches according to a predetermined criteria. In embodiments of the invention, the re-ranking operation using a BERT-base model. The re-ranking operations can improve the set of retrieved table-parts that will be presented to the cell or header selection. At block 418, the methodology 400 selects from the top "N" UDRSV matches at least one UDRSV that can be used to provide an answer to the query information.

From block 418, the methodology 400 moves to block 420 and decision block 422. At block 420, the methodology 400 performs processing that augments the TBAIS using the answers generated at block 418. Decision block 422 evaluates whether there are more queries. If the answer to the inquiry at decision block 422 is no, the methodology 400 proceeds to block 424 and ends. If the answer to the inquiry at decision block 422 is yes, the methodology 400 returns to block 402 and performs another iteration of the methodology 400.

FIG. 5 depicts a simplified block diagram illustrating a data processor module 110B, which is a more general representation of the data processor module 110A shown in FIG. 3, along with an example of how the operations at block 410 (shown in FIG. 4) can be implemented as operations 410A using the "retrieval-based, self-supervised pre-training operation with no ground truth" 510 (i.e., no annotated or labeled data/information in the data repository 130 and/or the data lake 130A), a sequencer 512, and a transformer model module 512, configured and arranged as shown. In accordance with embodiments of the invention, the vector matching module 306 performs a vector matching operation (e.g., using an ANN operation) that identifies the sequenced and vectorized instances of data/information from the data repository 130, 130A that match (or are nearest to) the encoded (or vectorized) sequence generated by the transformer model module 304 to generate candidate query responses 516. Additional details of how the operations at 510 can be implemented are shown in FIGS. 6 and 7 and described in greater detail subsequently herein.

Figure 6:
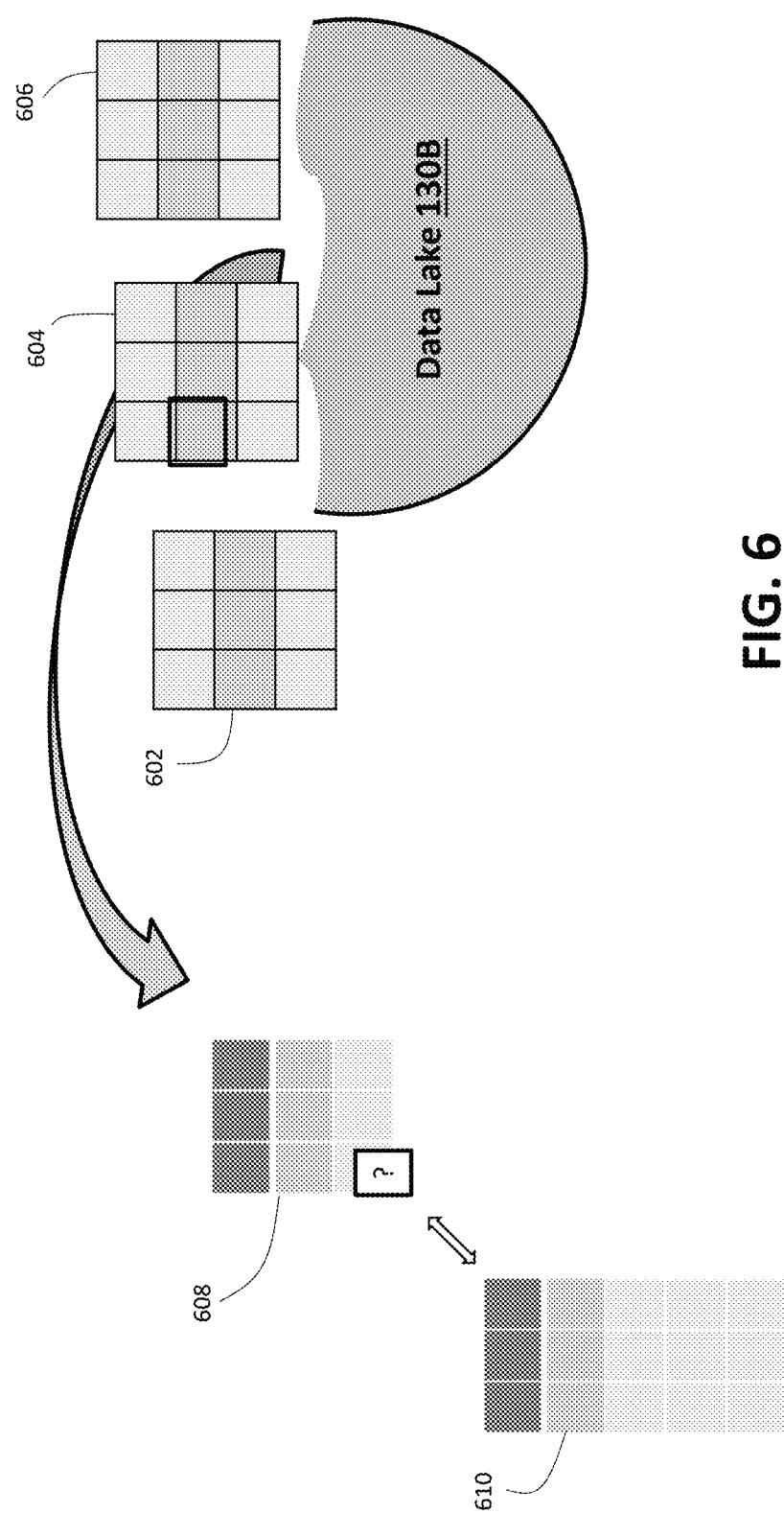
FIG. 6 depicts a simplified block diagram illustrating retrieval training operations according to aspects of the invention.

FIG. 6 depicts initial operations of the retrieval-based, self-supervised operations at block 510 (shown in FIG. 5). As shown in FIG. 6, the tables 602, 604, 606 of a data lake 130B are different tables so there will be diversity among the tables 602, 604, 606. However, there will also be some redundancy in the data lake 130B, so many tables can be partially reconstructed from other tables in the data lake 130B. We can construct ablated tables 608 from the tables in the data lake 130B and use the ablated table 608 as a query (e.g., for row population) to the data lake 130B and (partially) and complete the ablated table 608 with entries from the other tables (e.g., tables 602, 604, 606) that could have answers to the query in the ablated table 608, thereby forming the reconstructed table 610, which is completed using entries from the data lake 130B with not ground truth required.

Figure 7:
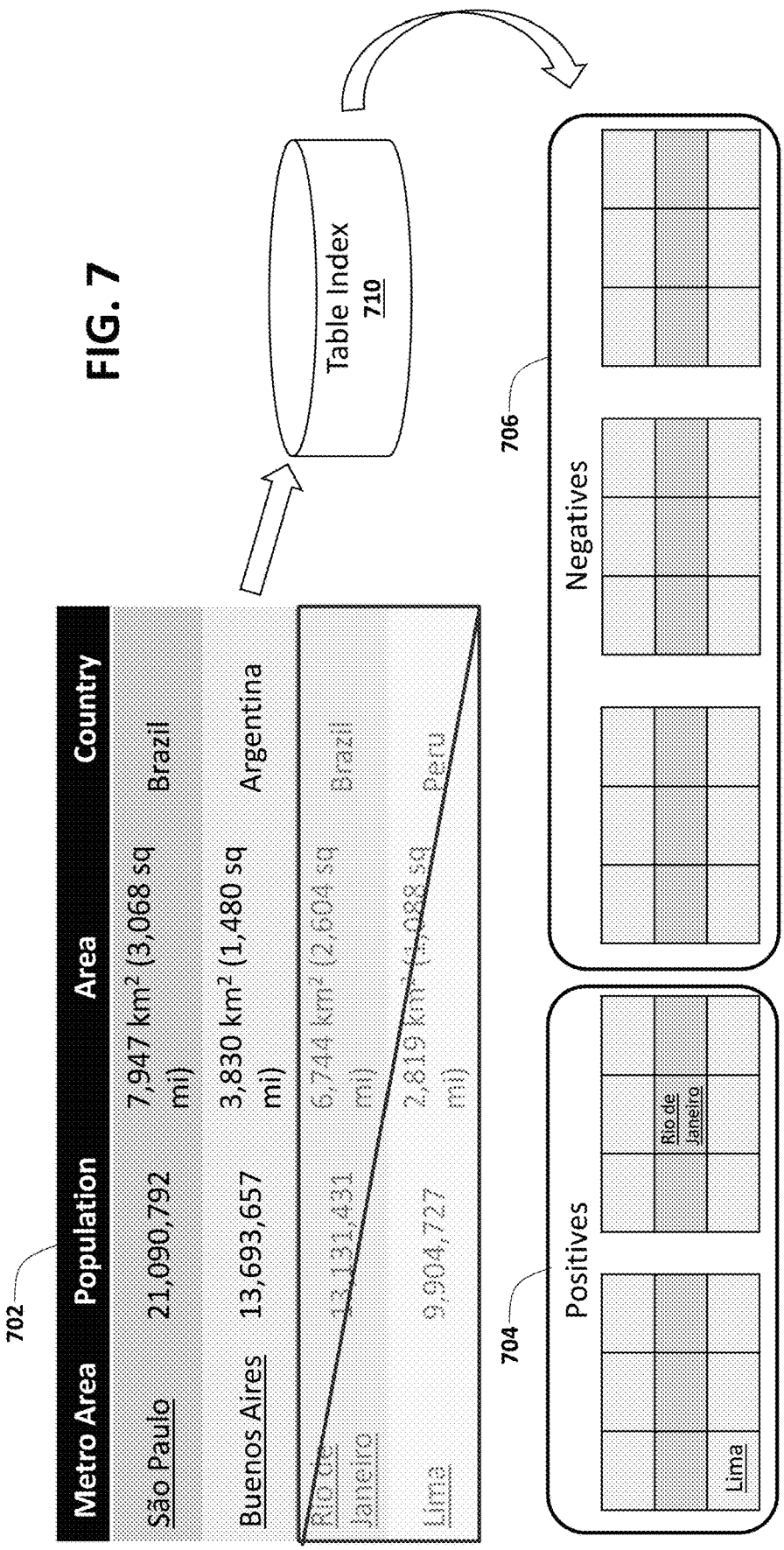
FIG. 7 depicts a simplified block diagram illustrating retrieval training operations according to aspects of the invention.

FIG. 7 depicts additional details of the retrieval-based self-supervised operations at block 510 (shown in FIG. 5). More specifically, FIG. 7 depicts an ablated table 702 used to query the table index 710 that returns some result tables. The table index 710 is built from the tables in the training set (e.g., the query table(s) 108C and the data processor 110A shown in FIG. 3), which are first decomposed into table-parts, then transformed into sequences for use with retrieval approaches depicted in FIG. 3. Continuing with FIG. 7, some of the returned tables have an entity in them that is an answer to the query. In the case of row population, an assumption of the multi-instance training used in aspects of the invention is that any table that contains an entity that matches an entity in the key column of the query table 702 (i.e., in the ablated rows) is a positive 704 (or semi-positive), and that is a table that could potentially provide the answer to the query. Any table that contains only entities that do not match any entity in the key column of the query table 702 (i.e., in the ablated rows) is a negative 706, and that is a table that could not provide an answer to the query. In other words, the positives 702 is seen as a bag of tables where at least one of the tables is actually positive in that the at least one of the tables in the bag of table can be sued to provide the answer to the query. The approach depicted in FIG. 7 is described herein as "Dense Table Retrieval" training. The purpose of Dense Table Retrieval is to improve over traditional BM25 retrieval by using a pre-trained transformer model that has a better understanding of natural language.

FIG. 8 depicts additional details of how the cell or header selection module 312 (shown in FIG. 3) can be implemented in accordance with aspects of the invention. FIG. 8 represents the training that occurs through the actual use of the data processor 110A (shown in FIG. 3). As shown, the query table 108C and the result (or retrieved) table are provided to a reader transformer 804 that works with a cell relevance classifier 804 to generate Retrieval Scores and a Combined Cell Score. The Retrieval Score is the inner product (dot product) between the query vector (the table query projected to a vector) and the retrieved table-part vector (the table-part projected to a vector). The score from the cell relevance classifier 804 is the token vectors (the transformer produces vectors for each token) for the start and end token concatenated together and multiplied (inner product) by a learned weight vector. Then these two scores are added for the Combined Cell Score.

FIG. 9 depicts an example table augmentation result achieved in accordance with embodiments of the invention. FIG. 9 depicts an example query table, an example row population answer, and an example column population answers. In accordance with aspects of the invention, the table augmentation tasks in FIG. 9 are completed using entirely self-supervised processes that require no manual labeling.

Thus, it can be seen from the foregoing detailed description that embodiments of the invention provide a variety of technical effects and benefits. For example, embodiments of the invention are directed to a processor system operable to access query information associated with the to-be-augmented information set (TBAIS) having the TBAIS format. The query information sequence vectors (QISV) are generated that represent the query information and the TBAIS. Unannotated data repository information sequence vectors (UDRSV) are accessed that represent unannotated data repository information having a plurality of information formats. Matching UDRSV are identified, where the matching UDRSV include the UDRSV that match the QISV. A response to the query information is generated based at least in part on the matching UDRSV.

Technical effects and benefits of the above-described embodiments of the invention include providing a retrieval-based technique for identifying a response to the query by drawing the response from contents of a data repository having a plurality of information formats. The claimed retrieval-based response generation technique is trained to provide the best possible response from the data repository having predefined responses that are based on existing information. The claimed retrieval-based response technique does not rely on keywords matching, parametric-based machine learning, or parametric-based deep learning to create the response, but instead uses a novel vector matching technique to "retrieve" the most appropriate response, thus avoiding the additional uncertainty and inaccuracies that are introduced by the process of creating a response that did not previously exist. Additionally, the data repository information is unannotated, which means the response is identified in or retrieved from the unannotated data repository using a self-supervised identification technique for identifying matching UDRSV that includes the UDRSV that match the QISV without having to incur the expense (time and/or cost) of annotating or otherwise labeling the data repository information prior to analysis.

In addition to one or more of the features described above, or as an alternative to any of the foregoing embodiments of the invention, generating the QISV includes converting the query information to sequenced query information; and using a transformer model of the processor system to convert the sequenced query information to the QISV.

Technical effects and benefits of the above-described embodiments of the invention include incorporating a sequence-based, transformer model into the retrieval-based technique for identifying a response to the query that draws the response from contents of the data repository having the plurality of information formats. The claimed transformer model is non-parametric in that it does not rely on using "parametric" machine learning vector-analysis techniques to uncover hidden data relationships that are used to generate a response that did not previously exist. The responses generated by parametric approaches to using transformer models do not include any type of explanation, guidance, or accuracy conformation information for how the generated output from the transformer model was generated. By contrast, the claimed transformer model is used in a process that provides a traceable path to the selected response and how the selected response was matched with the query, thus allowing the generation of explanations, guidance, or accuracy conformation information for how the response generated using the novel vector-based matching techniques was generated.

In addition to one or more of the features described above, or as an alternative to any of the foregoing embodiments of the invention, identifying the matching UDRSV comprises using an approximate nearest neighbor (ANN) search technique operable to identify one or more instances of the UDRSV that substantially match the QISV.

Technical effects and benefits of the above-described embodiments of the invention include incorporating an ANN search technique that facilitates the previously-described self-supervised identification technique for identifying matching UDRSV that includes the UDRSV that match the QISV without having to incur the expense (time and/or cost) of annotating or otherwise labeling the data repository information prior to analysis.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 10:
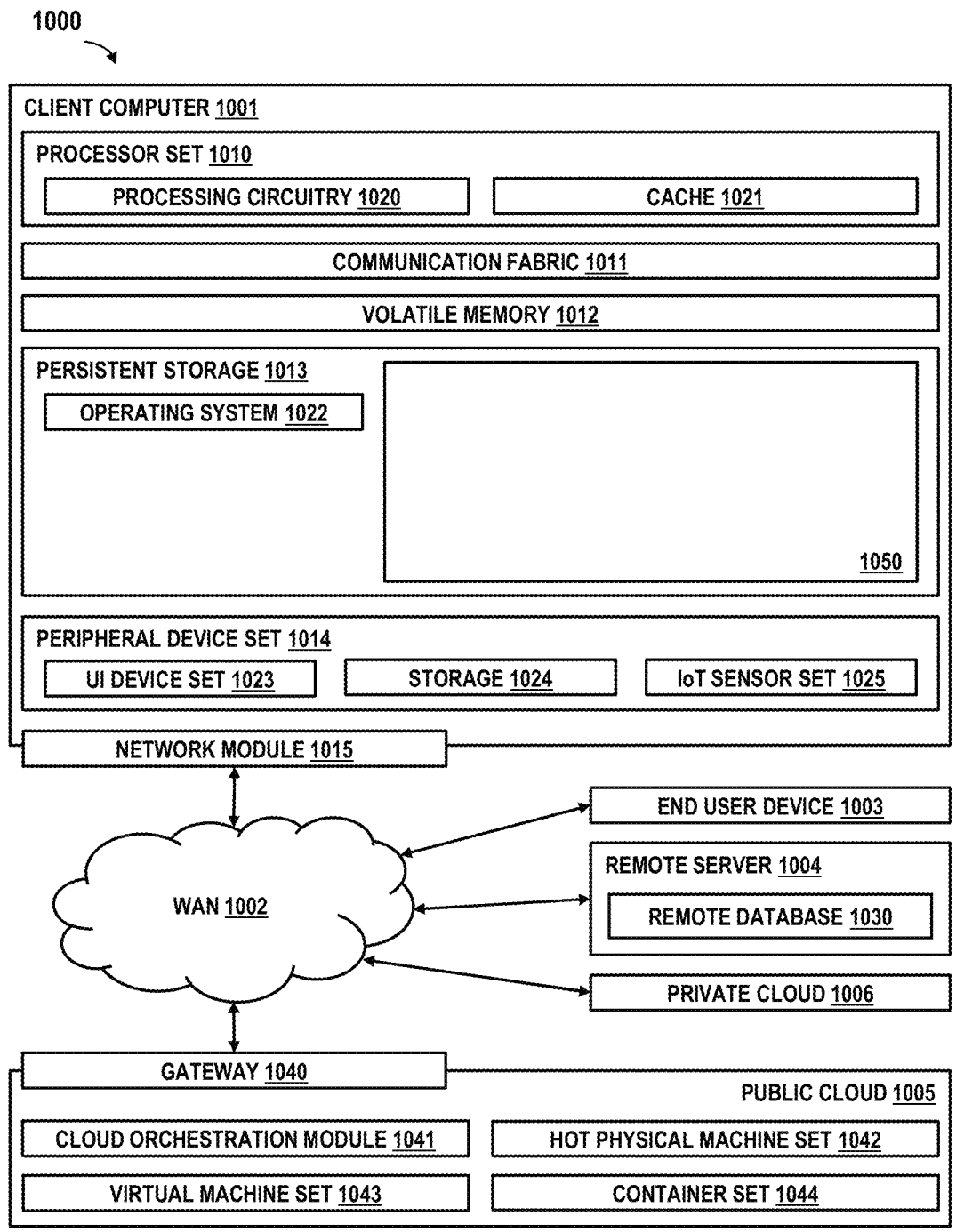
FIG. 10 depicts details of an exemplary computing environment operable to implement various aspects of the invention.

FIG. 10 depicts an example computing environment 1000 that can be used to implement aspects of the invention. Computing environment 1000 contains an example of an environment for the execution of at least some of the computer code involved in performing the inventive methods, such as the retrieval-based, self-supervised information/data augmentation techniques using transformer models 1050 operable to implement novel retrieval-based, self-supervised information/data augmentation techniques using transformer models. In addition to block 1050, computing environment 1000 includes, for example, computer 1001, wide area network (WAN) 1002, end user device (EUD) 1003, remote server 1004, public cloud 1005, and private cloud 1006. In this embodiment, computer 1001 includes processor set 1010 (including processing circuitry 1020 and cache 1021), communication fabric 1011, volatile memory 1012, persistent storage 1013 (including operating system 1022 and block 1050, as identified above), peripheral device set 1014 (including user interface (UI) device set 1023, storage 1024, and Internet of Things (IoT) sensor set 1025), and network module 1015. Remote server 1004 includes remote database 1030. Public cloud 1005 includes gateway 1040, cloud orchestration module 1041, host physical machine set 1042, virtual machine set 1043, and container set 1044.

COMPUTER 1001 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1030. As is well understood in the art of computer technology, and depending upon the technology, performance of a computer-implemented method may be distributed among multiple computers and/or between multiple locations. On the other hand, in this presentation of computing environment 1000, detailed discussion is focused on a single computer, specifically computer 1001, to keep the presentation as simple as possible. Computer 1001 may be located in a cloud, even though it is not shown in a cloud in FIG. 10. On the other hand, computer 1001 is not required to be in a cloud except to any extent as may be affirmatively indicated.

PROCESSOR SET 1010 includes one, or more, computer processors of any type now known or to be developed in the future. Processing circuitry 1020 may be distributed over multiple packages, for example, multiple, coordinated integrated circuit chips. Processing circuitry 1020 may implement multiple processor threads and/or multiple processor cores. Cache 1021 is memory that is located in the processor chip package(s) and is typically used for data or code that should be available for rapid access by the threads or cores running on processor set 1010. Cache memories are typically organized into multiple levels depending upon relative proximity to the processing circuitry. Alternatively, some, or all, of the cache for the processor set may be located "off chip." In some computing environments, processor set 1010 may be designed for working with qubits and performing quantum computing.

Computer readable program instructions are typically loaded onto computer 1001 to cause a series of operational steps to be performed by processor set 1010 of computer 1001 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1021 and the other storage media discussed below. The program instructions, and associated data, are accessed by processor set 1010 to control and direct performance of the inventive methods. In computing environment 1000, at least some of the instructions for performing the inventive methods may be stored in block 1050 in persistent storage 1013.

COMMUNICATION FABRIC 1011 is the signal conduction path that allows the various components of computer 1001 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 1012 is any type of volatile memory now known or to be developed in the future. Examples include dynamic type random access memory (RAM) or static type RAM. Typically, volatile memory 1012 is characterized by random access, but this is not required unless affirmatively indicated. In computer 1001, the volatile memory 1012 is located in a single package and is internal to computer 1001, but, alternatively or additionally, the volatile memory may be distributed over multiple packages and/or located externally with respect to computer 1001.

PERSISTENT STORAGE 1013 is any form of non-volatile storage for computers that is now known or to be developed in the future. The non-volatility of this storage means that the stored data is maintained regardless of whether power is being supplied to computer 1001 and/or directly to persistent storage 1013. Persistent storage 1013 may be a read only memory (ROM), but typically at least a portion of the persistent storage allows writing of data, deletion of data and re-writing of data. Some familiar forms of persistent storage include magnetic disks and solid state storage devices. Operating system 1022 may take several forms, such as various known proprietary operating systems or open source Portable Operating System Interface-type operating systems that employ a kernel. The code included in block 1050 typically includes at least some of the computer code involved in performing the inventive methods.

PERIPHERAL DEVICE SET 1014 includes the set of peripheral devices of computer 1001. Data communication connections between the peripheral devices and the other components of computer 1001 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 1023 may include components such as a display screen, speaker, microphone, wearable devices (such as goggles and smart watches), keyboard, mouse, printer, touchpad, game controllers, and haptic devices. Storage 1024 is external storage, such as an external hard drive, or insertable storage, such as an SD card. Storage 1024 may be persistent and/or volatile. In some embodiments, storage 1024 may take the form of a quantum computing storage device for storing data in the form of qubits. In embodiments where computer 1001 is required to have a large amount of storage (for example, where computer 1001 locally stores and manages a large database) then this storage may be provided by peripheral storage devices designed for storing very large amounts of data, such as a storage area network (SAN) that is shared by multiple, geographically distributed computers. IoT sensor set 1025 is made up of sensors that can be used in Internet of Things applications. For example, one sensor may be a thermometer and another sensor may be a motion detector.

NETWORK MODULE 1015 is the collection of computer software, hardware, and firmware that allows computer 1001 to communicate with other computers through WAN 1002. Network module 1015 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1015 are performed on the same physical hardware device. In other embodiments (for example, embodiments that utilize software-defined networking (SDN)), the control functions and the forwarding functions of network module 1015 are performed on physically separate devices, such that the control functions manage several different network hardware devices. Computer readable program instructions for performing the inventive methods can typically be downloaded to computer 1001 from an external computer or external storage device through a network adapter card or network interface included in network module 1015.

WAN 1002 is any wide area network (for example, the internet) capable of communicating computer data over non-local distances by any technology for communicating computer data, now known or to be developed in the future. In some embodiments, the WAN 1002 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1003 is any computer system that is used and controlled by an end user (for example, a customer of an enterprise that operates computer 1001), and may take any of the forms discussed above in connection with computer 1001. EUD 1003 typically receives helpful and useful data from the operations of computer 1001. For example, in a hypothetical case where computer 1001 is designed to provide a recommendation to an end user, this recommendation would typically be communicated from network module 1015 of computer 1001 through WAN 1002 to EUD 1003. In this way, EUD 1003 can display, or otherwise present, the recommendation to an end user. In some embodiments, EUD 1003 may be a client device, such as thin client, heavy client, mainframe computer, desktop computer and so on.

REMOTE SERVER 1004 is any computer system that serves at least some data and/or functionality to computer 1001. Remote server 1004 may be controlled and used by the same entity that operates computer 1001. Remote server 1004 represents the machine(s) that collect and store helpful and useful data for use by other computers, such as computer 1001. For example, in a hypothetical case where computer 1001 is designed and programmed to provide a recommendation based on historical data, then this historical data may be provided to computer 1001 from remote database 1030 of remote server 1004.

PUBLIC CLOUD 1005 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 1005 is performed by the computer hardware and/or software of cloud orchestration module 1041. The computing resources provided by public cloud 1005 are typically implemented by virtual computing environments that run on various computers making up the computers of host physical machine set 1042, which is the universe of physical computers in and/or available to public cloud 1005. The virtual computing environments (VCEs) typically take the form of virtual machines from virtual machine set 1043 and/or containers from container set 1044. It is understood that these VCEs may be stored as images and may be transferred among and between the various physical machine hosts, either as images or after instantiation of the VCE. Cloud orchestration module 1041 manages the transfer and storage of images, deploys new instantiations of VCEs and manages active instantiations of VCE deployments. Gateway 1040 is the collection of computer software, hardware, and firmware that allows public cloud 1005 to communicate through WAN 1002.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1006 is similar to public cloud 1005, except that the computing resources are only available for use by a single enterprise. While private cloud 1006 is depicted as being in communication with WAN 1002, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1005 and private cloud 1006 are both part of a larger hybrid cloud.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The terminology used herein is for the purpose of describing particular embodiments of the invention only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of +8% or 5%, or 2% of a given value.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

It will be understood that those skilled in the art, both now and in the future, may make various improvements and enhancements which fall within the scope of the claims which follow.

What is claimed is:

1. A computer system comprising a processor system coupled to a memory, wherein the processor system is configured to perform processor system operations comprising:
   accessing query information associated with a to-be-augmented information set (TBAIS) having a TBAIS format;
   applying the query information, the TBAIS, and the TBAIS format to a sequencer to generate a sequence;
   applying the sequence to a non-parametric transformer of the processor system to generate query information sequence vectors (QISV) that represent the query information and the TBAIS;
   accessing unannotated data repository information sequence vectors (UDRSV) that represent unannotated data repository information having a plurality of information formats;
   applying an approximate nearest neighbor (ANN) search technique of the processor system to identify matching UDRSV comprising the UDRSV that match the QISV;
   wherein the non-parametric transformer and the ANN search technique provide a traceable path to how the ANN search technique identified the matching UDRSV; and
   generating a response to the query information based at least in part on the matching UDRSV.

2. The computer system of claim 1, wherein the processor system operations further comprise incorporating the response into the TBAIS to generate an augmented version of the TBAIS.

3. The computer system of claim 1, wherein the TBAIS format is different from at least one of the plurality of information formats.

4. The computer system of claim 3, wherein the TBAIS format is selected from the group consisting of a database, a table, and a portable document format (PDF).

5. The computer system of claim 3, wherein the information format is selected from the group consisting of a database, a table, and a portable document format (PDF).

6. The computer system of claim 1, wherein the processor system operations further comprise using the traceable path to generate an explanation of how the ANN search technique identified the matching UDRSV.

7. The computer system of claim 1, wherein the processor system operations further comprise using the traceable path to generate accuracy confirmation information for the matching UDRSV.

8. A computer-implemented method comprising:
   accessing, using a processor system, query information associated with a to-be-augmented information set (TBAIS) having a TBAIS format;
   applying the query information, the TBAIS, and the TBAIS format to a sequencer to generate a sequence;
   applying the sequence to a non-parametric transformer of the processor system to generate query information sequence vectors (QISV) that represent the query information and the TBAIS;
   accessing, using the processor system, unannotated data repository information sequence vectors (UDRSV) that represent unannotated data repository information having a plurality of information formats;
   applying an approximate nearest neighbor (ANN) search technique of the processor system to identify matching UDRSV comprising the UDRSV that match the QISV;
   wherein the non-parametric transformer and the ANN search technique provide a traceable path to how the ANN search technique identified the matching UDRSV; and
   generating, using the processor system, a response to the query information based at least in part on the matching UDRSV.

9. The computer-implemented method of claim 8 further comprising incorporating the response into the TBAIS to generate an augmented version of the TBAIS.

10. The computer-implemented method of claim 8, wherein the TBAIS format is different from at least one of the plurality of information formats.

11. The computer-implemented method of claim 10, wherein the TBAIS format is selected from the group consisting of a database, a table, and a portable document format (PDF).

12. The computer-implemented method of claim 10, wherein the information format is selected from the group consisting of a database, a table, and a portable document format (PDF).

13. The computer-implemented method of claim 8 further comprising using the traceable path to generate an explanation of how the ANN search technique identified the matching UDRSV.

14. The computer-implemented method of claim 8 further comprising using the traceable path to generate accuracy confirmation information for the matching UDRSV.

15. A computer program product comprising a computer readable program stored on a computer readable storage medium, wherein the computer readable program, when executed on a processor system, causes the processor to perform processor system operations comprising:

accessing query information associated with a to-be-augmented information set (TBAIS) having a TBAIS format;

applying the query information, the TBAIS, and the TBAIS format to a sequencer to generate a sequence;

applying the sequence to a non-parametric transformer of the processor system to generate query information sequence vectors (QISV) that represent the query information and the TBAIS;

accessing unannotated data repository information sequence vectors (UDRSV) that represent unannotated data repository information having a plurality of information formats;

applying an approximate nearest neighbor (ANN) search technique of the processor system to identify matching UDRSV comprising the UDRSV that match the QISV;

wherein the non-parametric transformer and the ANN search technique provide a traceable path to how the ANN search technique identified the matching UDRSV; and generating a response to the query information based at least in part on the matching UDRSV.

16. The computer program product of claim 15, wherein the processor system operations further comprise incorporating the response into the TBAIS to generate an augmented version of the TBAIS.

17. The computer program product of claim 15, wherein the TBAIS format is different from at least one of the plurality of information formats.

18. The computer program product of claim 17, wherein the TBAIS format and the information format are each selected from the group consisting of a database, a table, and a portable document format (PDF).

19. The computer program product of claim 15, wherein the processor system operations further comprise using the traceable path to generate an explanation of how the ANN search technique identified the matching UDRSV.

20. The computer program product of claim 15, wherein the processor system operations further comprise using the traceable path to generate accuracy confirmation information for the matching UDRSV.

\* \* \* \* \*